(12) United States Patent
Hunt et al.

(10) Patent No.: US 7,582,335 B2
(45) Date of Patent: Sep. 1, 2009

(54) FOAMED MATERIAL AND A METHOD OF MAKING A FOAMED MATERIAL

(75) Inventors: Joanne S. Hunt, Aylesbury (GB); Julie Baker, Leavesden (GB); Alan R. Pitt, Sandridge (GB)

(73) Assignee: Eastman Kodak Company, Rochester, NY (US)

( * ) Notice: Subject to any disclaimer, the term of this patent is extended or adjusted under 35 U.S.C. 154(b) by 422 days.

(21) Appl. No.: 10/551,916

(22) PCT Filed: Apr. 2, 2004

(86) PCT No.: PCT/GB2004/001470

§ 371 (c)(1), (2), (4) Date: Oct. 5, 2005

(87) PCT Pub. No.: WO2004/090027

PCT Pub. Date: Oct. 21, 2004

(65) Prior Publication Data

US 2006/0270745 A1  Nov. 30, 2006

(30) Foreign Application Priority Data

Apr. 5, 2003 (GB) ................. 0307963.9

(51) Int. Cl.
*C08J 3/28* (2006.01)
*C08J 9/00* (2006.01)
*C08J 9/04* (2006.01)
*C08J 9/28* (2006.01)
*C08J 9/30* (2006.01)
*C08J 9/32* (2006.01)
*B41M 5/00* (2006.01)

(52) U.S. Cl. ............... 427/553; 427/557; 427/508; 427/466; 521/50.5; 521/65

(58) Field of Classification Search ........ 521/50.5, 521/65, 66, 72; 427/508, 553, 557, 466
See application file for complete search history.

(56) References Cited

U.S. PATENT DOCUMENTS

| 4,296,210 A | | 10/1981 | Zimmermann et al. |
| 4,808,637 A | * | 2/1989 | Boardman et al. ......... 521/50.5 |
| 5,128,313 A | | 7/1992 | Aono |
| 5,338,766 A | * | 8/1994 | Phan et al. .................. 521/63 |
| 5,382,285 A | | 1/1995 | Morrison |
| 6,261,679 B1 | * | 7/2001 | Chen et al. ............... 428/317.9 |
| 2005/0112302 A1 | * | 5/2005 | Laney et al. .............. 428/32.31 |
| 2006/0015083 A1 | * | 1/2006 | Munro et al. ............... 604/367 |
| 2007/0054070 A1 | * | 3/2007 | Laney et al. .............. 428/32.34 |

FOREIGN PATENT DOCUMENTS

WO        02/26872 A1    4/2002

* cited by examiner

*Primary Examiner*—Susan W Berman
(74) *Attorney, Agent, or Firm*—Chris P. Konkol; Arthur E. Kluegel

(57) ABSTRACT

The invention provides a method of making a material, said method comprising generating a foamed hydrophilic polymer solution, especially of a gelatin or derivative thereof, and treating said foamed hydrophilic polymer solution with sufficient energy and for a sufficiently short time that a polymer foam having an open-cell structure is formed. The invention also provides a material comprising a support and an ink receiving layer supported on the support, the ink receiving layer comprising porous hydrophilic polymer, especially gelatin, and is formed by coating a solution of foamed hydrophilic polymer, especially gelatin, onto a support substrate and drying the coated substrate for a time period selected to be short enough such that an open-cell foam is formed.

17 Claims, 2 Drawing Sheets

FOAMED MATERIAL AND A METHOD OF MAKING A FOAMED MATERIAL

FIELD OF THE INVENTION

The present invention relates to a method of making a foamed material. In particular the invention relates to a method of making a foamed material suitable for use as, amongst other things, an ink-jet receiver. The invention also relates to a material made using the method.

BACKGROUND OF THE INVENTION

To be suitable for use as an ink-jet receiver, a material is preferably quick to absorb applied ink and also, once dry, printed images are preferably stable when subjected to light and ozone. Ink-jet media having a porous layer are typically formed of inorganic materials with a polymeric binder. When ink is applied to the medium it is absorbed quickly into the porous layer by capillary action. However, the open nature of the layer can contribute to a lack of stability of printed images when subjected to light and ozone. Ink-jet media having a non-porous layer are typically formed by the coating of one or more polymeric layers onto a support. When ink is applied to such media, the polymeric layers swell and absorb the applied ink. However, due to limitations of the swelling mechanism, this type of media is slow to absorb the ink, but once dry, printed images are often stable when subjected to light and ozone.

Polymer foams have been developed that are suitable for use as inkjet receivers. The materials, as disclosed for example in our co-pending European Patent Application Number 03015858.8, can be both quick to absorb applied ink and also provide images that are stable to light and ozone once dry.

Traditionally, polymer foams are manufactured using mostly hydrophobic thermoplastic materials such as polyurethane, PVC and polyethylene. Initially a gas filled polymer is created using a known foaming method, the gas-filled polymer then being coated onto a support substrate.

Typical-foaming methods include:
1. Thermal decomposition of chemical blowing agents, generating $N_2$ or $CO_2$, by application of heat or as a result of the exothermic heat of reaction during polymerisation.
2. Mechanical whipping of gases into a polymer melt, which hardens either by catalytic action or heat, trapping gas bubbles in a matrix.
3. The use of low boiling point liquids which boil at low temperatures thereby creating gas.
4. Expansion of a gas dissolved in a polymer upon reduction of pressure in the system.
5. Incorporation of microspheres into a polymer mass, the microspheres consisting of gas filled polymer that expands upon heating.

After obtaining the gas filled polymer by one or more of the methods above, the material is then formed, typically, using one of three common manufacturing processes:
1. Compression moulding
2. Reaction injection moulding or
3. Extrusion of the foam.

The temperatures involved in these processes can be very high, e.g. in excess of 150° C., as the polymers used are in their molten state. The most common processing method used in creating polymer foam films is extrusion. This is a three-stage operation consisting of forming a polymer solution with gas dissolved in it, by injection of $N_2$ or $CO_2$, or by the use of blowing agent, to create a single phase solution. Nucleation sites are then formed, as a result of a rapid pressure drop to create large numbers of uniform sites. Cell growth then takes place by means of diffusion of the gas to form bubbles. Control of the processing conditions provides the pressure and temperature changes necessary to control cell growth.

US-A-2001/0021726 (James F. Brown) discloses porous surface compositions and methods of retaining biological samples on the surface. The method relies on the use of curable polymers. U.S. Pat. No. 3,794,548 (C. Wirth et al) discloses the use of polyurethane as a porous polymer film. Polymer is heated causing volatilisation of solvents within the polymer resulting in a porous coating. U.S. Pat. No. 6,228,476 (Bogrett et al) relates to a foam insulation sheet made using curable polymers.

Problem to Be Solved By the Invention

A problem with conventional methods of making foamed materials suitable for use as ink-jet receivers is that the methods used to create polymer foams rely on high processing temperatures. This is undesirable as it is expensive in terms of energy requirements. Furthermore it is desirable to have a manufacturing process that does not require high temperatures, on grounds of safety.

A method of making a material is desired without the use of traditional foam manufacturing systems. A material is also required that can be made using methods that do not rely on traditional foam manufacturing systems.

SUMMARY OF THE INVENTION

According to the present invention, there is provided a method of making a material, said method comprising generating a foamed hydrophilic polymer solution and treating said foamed hydrophilic polymer solution with sufficient energy and for a sufficiently short time that a polymer foam having an open-cell structure is formed.

In a second aspect of the invention, there is provided a material obtainable by the above method.

In a third aspect of the invention, there is provided an ink-jet receiver comprising a material as defined above.

In a fourth aspect of the invention, there is provided an ink-jet receiver, comprising a support and an ink-receiving layer on said support, said ink-receiving layer comprising a hydrophilic polymer foam material obtainable by the above method.

In a fifth aspect of the invention, there is provided the use of microwave radiation to form a polymeric foam material having an open-cell structure from a foamed hydrophilic polymer solution.

Advantageous Effect of the Invention

The invention provides a method of making a material using a solution of hydrophilic polymer having bubbles created therein. In contrast to traditional polymer foams, which are manufactured using mostly hydrophobic thermoplastic materials such as polyurethane, PVC and polyethylene, lower processing temperatures can be used. Hydrophobic thermoplastic materials such as polyurethane, PVC and polyethylene require high processing temperatures since the polymers are in their molten state. Temperatures higher than 150° C. are commonplace.

The present invention provides a simple and robust method for the manufacture of a polymer foam material, suitable, for example, for use as an ink-jet receiver, which does not require the use of high processing temperatures. This is more efficient in terms of cost and energy consumption and is also safer.

By ensuring that the time period of the treating step in the method of the present invention is short, an open-celled structure in the polymer foam may be formed. This makes the material formed thereby particularly suitable for applications in which good absorption is required such as, for example, use as an ink-jet receiver.

DETAILED DESCRIPTION OF THE INVENTION

Figure 1:
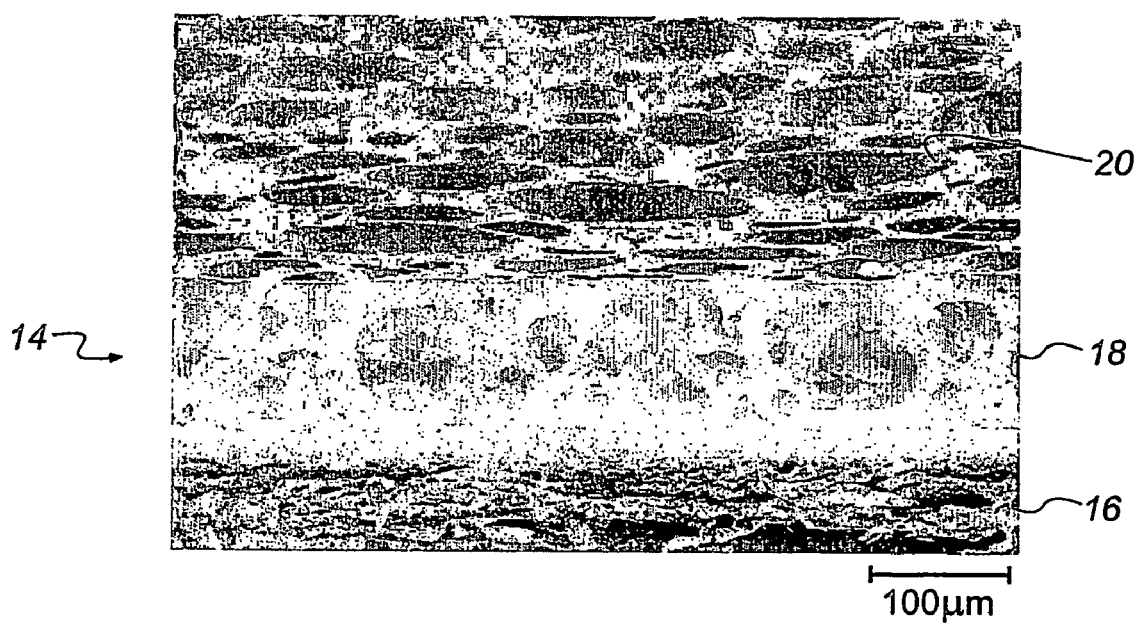
FIG. 1 shows a scanning electron micrograph of a section through a material made using the method of the present invention.

The invention is concerned with exposing a foamed hydrophilic polymer solution to sufficient energy for a sufficiently short period of time to effect formation of a polymer foam material having an open-cell structure.

By open-cell structure, it is meant that a polymer foam material having a network of interconnecting voids or cavities is formed. The foamed hydrophilic polymer solution will in these circumstances typically have an open-cell structure or be capable of forming an open-cell structured foam on treatment with sufficient energy, e.g. by rapidly drying a support substrate coated with such a solution.

Preferably, the network of interconnecting voids or cavities is surface accessible, i.e. a surface accessible open-cell structure, in which some of the voids or cavities making up the network are exposed on the surface of the polymer foam material. This has the additional benefit of enabling rapid uptake by the foamed polymer material of liquids applied to the surface thereof.

The hydrophilic polymer may be any foamable hydrophilic polymer such as, for example, one or more of polyvinyl alcohol (PVA), polyethylene oxide (PEO), polyvinyl pyrrolidone (PVP) and gelatin or derivatives thereof, preferably gelatin or derivative thereof.

By foamable hydrophilic polymer, it is meant a hydrophilic polymer that is capable of forming a foamed hydrophilic polymer solution in aqueous media when treated with one or more foaming techniques, either with or without additives intended to encourage formation of a foamed solution.

The treatment by which, according to the present invention, the foamed hydrophilic polymer solution is exposed to a source of energy of sufficient magnitude and for a time period short enough that a polymer foam material having an open-cell structural arrangement, as discussed above, may be any suitable method of exposing the foamed hydrophilic polymer solution to sufficient energy to achieve the open-cell arrangement in a sufficiently short time. The amount of energy and the time required may vary depending upon the amount of energy required or a maximum time appropriate for a given foamed hydrophilic polymer solution and upon the quantity of foamed hydrophilic polymer solution to be treated. The amount of energy and the time period for exposure of a particular foamed hydrophilic polymer solution depends upon a number of factors including the total amount of energy and the rate of exposure required for a particular foamed hydrophilic polymer solution to be capable of substantially maintaining its structural integrity (e.g. without collapse or degradation of the voids or cavities).

The treatment may involve, for example, intense heating of the foamed hydrophilic polymer solution to rapidly drive off water to form an open-cell polymer foam, application of heat in a reduced pressure environment, freeze drying or exposure of the foamed hydrophilic polymer solution to high energy radiation, preferably microwave radiation. The preferred treatment is by exposure to microwave radiation.

The time of treatment depends on a number of factors as discussed above, but where microwave radiation is utilised as the means of treatment, the period of exposure is preferably up to 8 minutes, more preferably up to 5 minutes and still more preferably up to 2 minutes or for a period required to enable the foamed polymer material formed to substantially maintain its structural integrity.

For example, a foamed gelatin coated support substrate may be treated with microwave radiation for a period of up to 8 minutes, preferably up to 5 minutes and more preferably up to 2 minutes, depending upon the power of the microwave radiation, in order to form a polymer foam material on a support substrate capable of substantially maintaining its internal structural integrity, or until the coated substrate is dried.

The foamed hydrophilic polymer solution may be generated by any suitable foaming method. For example, the foamed solution may be generated by air entrainment, e.g. by high shear stirring of a hydrophilic polymer solution into a foam or mechanical whipping of gas into the solution, by chemical or thermal decomposition of chemical blowing agents incorporated into the solution, by use of low boiling point liquids with the solution which vaporise to generate gas bubbles, by expansion of a gas dissolved in a polymer solution upon reduction of pressure into the system or by incorporation of a dispersion of microspheres into a polymer solution, the microspheres comprising gas filled polymer that expands upon heating. The preferred methods of generating the foamed hydrophilic polymer solution are by air entrainment through high shear stirring or through the use of thermally or chemically activated blowing agents.

Preferably, the treatment to form the polymer foam is carried out immediately or as soon as possible after the formation of the foamed hydrophilic polymer solution so that the network of voids or cavities, or potential network, doesn't have time to degrade or collapse before the treatment to largely maintain the integrity thereof in a polymer foam is complete.

The size of the bubbles or voids formed may be controlled to some degree depending upon the nature of the polymer foam desired and the intended utility. For example, microbubbles, e.g. in the range 10-100 µm, may be formed in a gelatin solution. For example, the presence of other additives in the solution, e.g. surfactants, and the choice thereof may affect the size of bubbles or voids formed, whether the foamed hydrophilic polymer solution is generated by air entrainment or by the activation of chemical or thermal responsive blowing agents.

Figure 2:
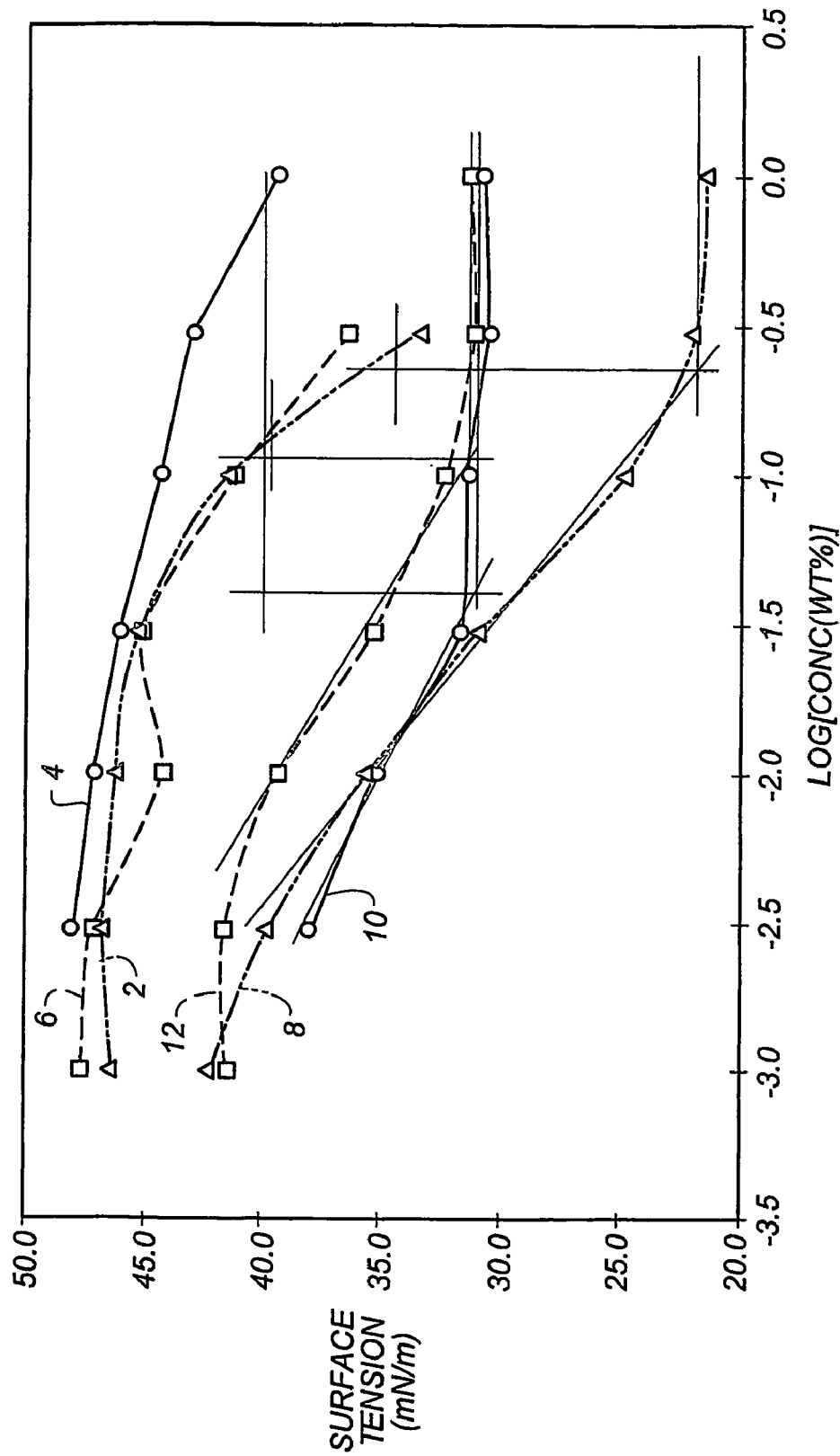
FIG. 2 shows a graph of variation in log(concentration of a surfactant) against surface tension for a number of different surfactants.

The selection of a surfactant for addition to the hydrophilic polymer solution enables control of the size of bubbles formed in the material. Our European Patent Application No. 03078204.9 (our ref. 85004) describes how the choice of surfactant may be used to control the size of bubbles or voids in the polymer foam formed. FIG. 2 shows a graph of variation in log(concentration of a surfactant) against both dynamic and static surface tension for three different surfactants A, B & C. Lines 2, 4 and 6 are the relationships between the variation in dynamic surface tension with changing logarithm of the concentration of surfactant for each of surfactants A, B and C respectively. Lines 8, 10 and 12 are the relationships between the variation in static surface tension with changing logarithm of the concentration of surfactant for each of surfactants A, B and C respectively.

For each of the surfactants, two different parameters are determined based on the relationships shown by lines 2 to 12. Firstly, the logarithm corresponding to the critical aggregation concentration CAC of each surfactant is identified by applying a straight line fit to the region of maximum slope of the static surface tension (SST) curves 8,10 and 12 and by applying another straight line fit to the region of the SST curve where the surface tension has levelled out at or close to a minimum value. The point at which these two lines intersect represents a logarithm value of a corresponding concentration, the concentration being known as the critical aggregation concentration, or CAC. As explained above, FIG. 2 shows a graph of variation in log(concentration of a surfactant) against both dynamic and static surface tension for three different surfactants. Accordingly, in this example, the CAC is represented by a log value.

Secondly, the log of the concentration corresponding to the midpoint of the dynamic surface tension (DST) curve, log $C^{mid\text{-}DST}$, is interpolated from the point on the DST curve 2, 4 and 6 where the surface tension is midway between that of the solvent i.e. the maximum dynamic surface tension and the value at the CAC i.e. minimum static surface tension.

It can be seen from FIG. 2 that the logarithm of the CAC of surfactant A is almost co-incident with the logarithm of the concentration corresponding to its $C^{mid\text{-}DST}$. Surfactant A also gives a low static surface tension at the concentrations that these surfactants are commonly used at, i.e. log[conc(wt %)]=−0.5. This surfactant therefore produces the smallest bubbles, as can be evidenced in Table 1 of European Patent Application No. 03078204.9.

For surfactant B, it can be seen that the logarithm of its CAC is much lower than the logarithm of the concentration corresponding to its $C^{mid\text{-}DST}$ and that its static surface tension levels out at much higher values than surfactant A. The average bubble size produced by surfactant B is significantly larger than that achieved with surfactant A. Although like surfactant A, the logarithm of the CAC of surfactant C is almost co-incident with the logarithm of the concentration corresponding to its $C^{mid\text{-}DST}$, its static surface tension levels out at a relatively high value like surfactant B, and like surfactant B results in much larger bubbles.

From this data, it is demonstrated that to achieve smaller bubbles the logarithm of the CAC of a surfactant used, needs to be close in value to the logarithm of the concentration corresponding to $C^{mid\text{-}DST}$ for that surfactant and that a low static surface tension of the surfactant is also required. If the graph in FIG. 2 were to be shown with a linear scale as opposed to a log scale, the condition would be that the CAC must be close in value to $C^{mid\text{-}DST}$. Typically, for a surfactant that satisfies this criterion, the logarithm of its CAC needs to be within 0.5 log units, preferably within 0.25 log units of the logarithm of the concentration corresponding to the $C^{mid\text{-}DST}$. A low static surface tension means a value less than 28 mN/m, preferably less than 24 mN/m. If only one of these criteria is achieved, much larger bubbles are produced.

In other words, for small bubbles to be formed in the foam and material two criteria should be met: First, the CAC of the surfactant should be of similar concentration to that associated with the midpoint of its dynamic surface tension curve $C^{mid\text{-}DST}$, which may be measured by a specified overflowing cylinder method; and secondly, the surfactant should also have a low static surface tension. If either the difference between the CAC and $C^{mid\text{-}DST}$ is too great i.e. greater than 0.5 log units, or the static surface tension is too high e.g. greater than 28 mN/m, larger bubbles are likely to be formed.

One or more surfactants may therefore be used to control the size of bubbles or voids in the ink-receiving layer of an ink-jet receiver. The bubble size may be controlled by selecting the surfactant or mixture of surfactants such that a desired bubble size is achieved. Without being bound by theory, it is believed that making use of certain properties of surfactants can allow bubble size to be controlled. In particular, it is believed that the CAC, SST and DST (as defined above) of the surfactants, and the inter-relationship between them can form the basis from which a surfactant may be chosen to enable a desired bubble size.

Preferably, therefore, the surfactant may be chosen to control bubble size according to certain properties of the surfactant, and, in particular, the CAC, SSC and DST and their inter-relationship as discussed above. More preferably, the surfactant is chosen such that it meets certain predetermined criteria relating to the properties of the surfactant such that the desired size of bubbles is formed in the polymer foam.

The surfactant may be any suitable surfactant that meets the criteria discussed above and may be selected according to the desired bubble size.

This method of controlling the size of bubbles formed is particularly effective when the foamed hydrophilic polymer solution is generated by activation of thermally or chemically responsive blowing agents, preferably thermally responsive blowing agents, such as the combination of sodium nitrite and ammonium chloride.

Surfactant A

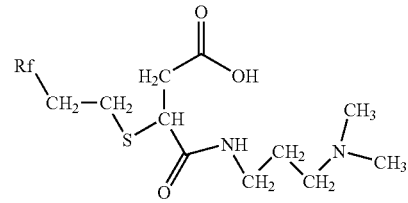

Rf is a range of fluorocarbon chain lengths based on the general structure $C_nF_{2n+1}$, where typically n possesses the following series of values, 6, 8, 10, 12, and 14.

Surfactant B

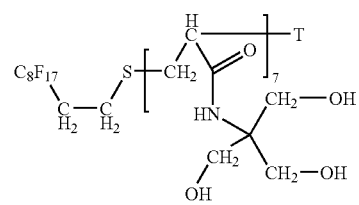

where the terminal group "T" is H.

Surfactant C

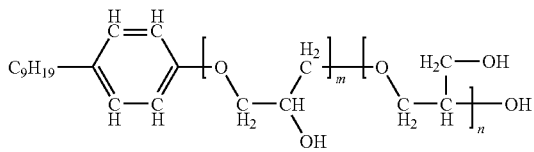

where m+n=10 on average

In one embodiment of the invention, as mentioned above, the foamed hydrophilic polymer solution is generated by activation of thermal or chemical responsive blowing agents. The one or more blowing agent used in the method of the present invention is selected in dependence on the temperature at which it reacts to generate gas. By selecting a blowing agent that reacts at a relatively low temperature, material may be formed without requiring high temperatures. Accordingly, blowing agents that react at a relatively low temperature, e.g. less than 200° C., more preferably in the range 50-120° C., are preferred. Examples of suitable blowing agents for use in the method of the present invention, include a mixture of sodium nitrite and ammonium chloride, metal carbonates and bicarbonates. Further examples of suitable blowing agents are described in, for example, the Handbook of Polymeric Foams and Foam Technology, Edited by Daniel Klempner and Kurt C. Frisch, Chapter 17: Blowing Agents for Polymer Foams, Section 3 Chemical Blowing Agents, (Chapter written by Dr. Fyodor A. Shutov). The preferred blowing agent is a combination of sodium nitrite and ammonium chloride.

The amount of blowing agent in the polymer solution for use in generating the foamed polymer layer may, for example, be up to about 200% by weight as a proportion of blowing agent to polymer. Preferably, it would be in an amount of at least 5%, such as in an amount of from about 10% to about 60%, more preferably from about 30% to about 50%. Where more than one layer of a polymer solution for generating a foamed polymer material is coated onto a support, the proportion of blowing agent in each layer may vary, but is typically within the above ranges.

Preferably, a surfactant is comprised in the hydrophilic polymer solution for the purpose of controlling the size of bubbles or voids formed and/or to improve the coatability of the solution, pre or post foaming. The amount of surfactant present in a polymer solution for use in generating a foamed polymer material is preferably in the range of from about 0.01% to about 2.0% by weight as a proportion of polymer present and more preferably about 0.05% to about 1.0%. Where more than one layer of polymer solution is applied to a support, the proportion of surfactant in each layer may vary, but is in each case preferably within the aforementioned ranges.

Suitable surfactants for use in accordance with the present invention include, for example, Surfactant A (available as Lodyne™ S100), Surfactant B (which is described in US-A-2002/0155402, the content of which, describing Surfactant B and other surfactants that may be useful in the present invention, is incorporated herein by reference), Surfactant C (available as Olin™ 10G) and Surfactant D (available as Zonyl FSN), having the following structural formula:

Surfactant D

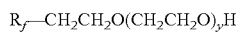

where y is 0-25 and $R_f$ is a range of fluorocarbon chain lengths and is represented by the structure $F(CF_2CF_2)_x$, where x is 1-9.

As discussed above, the surfactant may be selected in dependence of the void size desired in the resultant polymer foam material.

In a preferred embodiment of the invention, the polymer foam material is formed on a support substrate, preferably as a layer of coated material, which may be used as an ink-receiving layer or as a liquid sump beneath and image-receiving layer of an ink-jet receiver.

According to this embodiment, the method of the invention further comprises coating the hydrophilic polymer solution onto the support substrate either before or after generation of a foamed hydrophilic polymer solution therefrom and prior to the treatment step, which treatment step may resulting drying of the coated support substrate. Where the foamed hydrophilic polymer solution is formed by air entrainment through high shear stirring, for example, it is necessary to coat the foamed hydrophilic polymer solution onto the support substrate. Where, for example, the foamed solution is formed by activation of blowing agents, the support substrate may be coated before or after, or during, formation of the foamed solution.

The support may be, for example, a resin-coated paper, film base, acetate, polyethylene terephthalate (PET), a printing plate or other suitable support, preferably a resin-coated paper.

The support substrate may be coated using any suitable coating method, such as, for example, curtain coating, bead coating, air knife coating or any other suitable method.

In one preferred embodiment, in which the hydrophilic polymer solution is coated onto a support substrate, which may be suitable for use in ink-jet printing, and the foamed solution generated by activation of a blowing agent, the at least one blowing agent may be added to the polymer solution prior to, during or after coating of the polymer solution onto the support. Where a bead coater comprising a standard slide hopper is utilised for coating the support, the at least one blowing agent may, typically, be added to the polymer solution prior to or during coating of the polymer solution onto the support. Where the blowing agent is added to the polymer solution prior to coating onto the support, the interaction with the polymer solution in order to activate the blowing agent may begin prior to the step of coating the support. In this case, the receiver is prepared by coating a support with a layer of foamed polymer solution in which bubbles are formed. The bubbles are formed, for example, in an aqueous solution of a hydrophilic polymer and blowing agent. The aqueous solution containing the bubbles is then coated onto a support. The foamed polymer solution is created by heating the solution prior to its application to the support, to promote the decomposition of the blowing agent to generate a gas.

Preferably, however, according to this embodiment, the activation of the blowing agent is delayed until after coating of the support.

Typically, the interaction with the coated solution is by heating of the coated support, for example during the drying process. The heat causes the blowing agent to decompose and create gas bubbles, thereby forming a polymer foam on the support Alternatively, an acid may be added to the solution to react with the blowing agent again to generate a gas within the solution. In this alternative method, it is preferable that a compound, which on heating releases an acid, is added to the solution. When the solution is heated, acid is released which reacts with the blowing agent to cause decomposition of the blowing agent and the consequent generation of gas. When dry, the material is suitable for use as an ink-jet receiver.

The blowing agent may be selected such that the heat provided to dry the coated support is sufficient to cause decomposition of the blowing agent and generation of the gas.

According to another preferred embodiment, the method of making a material comprises the steps of, coating a foamed solution of a gelatin or derivative thereof onto a support substrate and drying the coated substrate using a treatment as described above, which time period for drying is selected to be short enough such that an open-cell foam is formed. Preferably, the method comprises prior to the step of coating a foamed polymer solution of a gelatin or derivative thereof onto a support substrate, the step of, forming the foamed polymer solution of a gelatin or derivative thereof. For example, the foamed gelatin solution may be formed using a blowing agent.

Preferably, the coated substrate is dried using microwave radiation as a source of energy.

Preferably, the step of drying the coated substrate lasts less than 8 minutes. More preferably, it lasts less than 5 minutes. Most preferably, it lasts less than 2 minutes.

FIG. 1 shows a scanning electron micrograph of a section through a material 14 according to a preferred embodiment of one aspect of the present invention made using a method according to a further aspect of the present invention. The material comprises a base 16 on which is arranged a foamed polymer layer 18. The foamed polymer layer has an open-celled arrangement made up of a number of interconnected cavities 20 within the layer 18. The layer 18 comprises gelatin.

A gelatin layer with void spaces is produced by generating or introducing gas into a coating solution. The layer is prepared by coating a layer of a foamed gelatin solution onto a substrate such as resin-coated paper. Micro-bubbles, e.g., bubbles having a diameter from about 10 µm to about 100 µm, are formed in the solution of gelatin. The micro-bubbles can be created by, for example, air entrainment or with the use of a chemical or physical blowing agent.

Air entrainment involves the high-shear stirring of a gelatin solution to cause air to be entrained and form micro-bubbles. Use of a blowing agent involves the addition of the agent to a solution of the gelatin, followed by interaction with the solution to promote decomposition of the blowing agent. The interaction can involve the application of heat to promote the decomposition of the blowing agent to form a gas, and/or by the addition of a chemical reactant such as an acid to react with the blowing agent to again form micro-bubbles within the solution.

The coating solution may have added to it a surfactant to improve its suitability for use in coating. Examples of suitable surfactants, in addition to those mentioned above, include OLIN™ 10G and TX200E.

The liquid composition containing the micro-bubbles is then coated onto a support. Any suitable coating method may be used. For example, any of bead coating, curtain, air knife coating or any other suitable coating method may be used. The coated layer is then dried to form the layer of open-celled foam. Typically, the drying may be achieved using microwave energy as a heat source. To ensure that an open-celled foam structure is formed it is preferable that the drying is done immediately after application of the solution so that the opportunity for the voids within the foam to collapse is reduced.

Typically, a drying time of less than five minutes is used. If the drying is done in a microwave oven a drying time of less than three minutes may be possible and more preferably less than two minutes. Providing a short drying time ensures that the opportunity for the voids within the foam to collapse is reduced.

The time required to dry the coated substrate is also affected by the thickness of the coating on the substrate. For example a thicker coating will usually take longer to dry than a thinner coating of the same material. In all cases, the drying time is selected and controlled such that it is short enough so that the open-celled nature of the foam is maintained in the final product. In a material having coating thickness suitable for use in a typical inkjet receiver, a drying time of less than 2, 3 or 5 minutes is sufficient.

In another aspect of the invention, there is provided a method of printing comprising the steps of loading an ink-jet printer with an ink-jet receiver obtainable by a method described above, and printing an image onto the ink-jet receiver using said printer to generate a print.

In a preferred embodiment of the method of printing, the method further comprises applying pressure and/or heat to a print generated using an ink-jet printer on an ink-jet receiver comprising a foamed polymer ink-receiving layer, obtainable by the above described methods. Surface properties of the print that may be improved by the method of printing include surface roughness (i.e. generating a print with a smoother surface) and glossiness.

Preferably, the method of printing comprises applying heat and pressure to the print. The heat and pressure may be applied to the print, for example by the use of a fusing device. In a preferred embodiment, the ink-jet print is treated by the application of heat and/or pressure using a belt fuser or a nip roller. In any case, it is preferable that the means for applying heat and/or pressure to the print, e.g. a fusing device, is integral to or associated with the ink-jet printer.

Typical heat and pressure conditions applied using a belt fuser at a rate of ~25 mm/s (0.5 inches per second (IPS)) are a temperature of 150° C. (300° F.) and 1080 kg/m (60 lbs/inch) nip pressure. The treatment conditions may be varied depending on the degree of gloss, surface roughness, etc. desired, and of course on the properties of the particular foamed polymer material.

On a more general application, the conditions for applying heat and/or pressure to the voided polymer receiver, especially a foamed polymer receiver, may range from 40-200° C., preferably in the range 60-160° C. and up to 2100 kg/m (120 lbs/inch) nip pressure, preferably from 720-1800 kg/m (40-100 lbs/inch) nip pressure. The rate that the receiver is passed, for example through a fusing device, may range from 6.25 to 500 mm/s, preferably from 10 to 250 mm/s.

Depending upon the amount of heat and/or pressure applied to the receiver, and on the specific properties of the voided polymer layer utilised in the invention, further benefits in image density, image stability and water fastness may be exhibited.

Ink-jet inks for use on ink-jet receivers made using the above methods may be any suitable inks, many such inks being known in the art, and are typically liquid compositions comprising a solvent or carrier liquid (such as water or aqueous alcohol solution), dyes and/or pigments, humectants, organic solvents, detergents, thickeners, preservatives and the like. The precise qualities of the foamed polymer receiver, such as a foamed polymer receiver, chosen may depend on the requirements of the type of printing and the type of ink and vice versa.

The present invention will now be described in detail, without limitation, in the following Example with reference to the accompanying drawing.

EXAMPLE

A solution of gelatin was coated onto a support consisting of a commercially available resin-coated paper. The coated layer was then dried creating a layer suitable for use as an ink-receiving layer if the material is to be used in inkjet printing.

The coating solution comprised an aqueous solution of gelatin mixed with a surfactant. The solution was whipped up using an electric high-shear stirrer at a speed of 15,000 rpm for 5 minutes. The ink-receiving layer consisted of 11.65 g/m$^2$ of gelatin and 2.408 g/m$^2$ of TX200E surfactant, which was coated using a gravure bar onto the support.

The coated substrate was then dried quickly, in this case using microwave radiation. The coated substrate was placed in a domestic microwave for 150 seconds on full power. The microwave used was a 700 Watt microwave, and an area of 0.0375 m$^2$ was coated. This provided power per area of approximately 1.86 watts/cm$^2$.

The scanning electron micrograph shown in FIG. 1 indicates that in the coating of the material according to the present invention, the foam mixture made by air entrainment has been coated and dried resulting in a surface accessible open-celled foamed layer, where the pores within the layer are interconnected. Such a material is suitable for use in any application in which an absorbent material is required such as, amongst others, use as an inkjet receiver.

The invention claimed is:

1. A method of making a material, said method comprising the steps of:
   (a) generating a foamed hydrophilic polymer solution;
   (b) coating the foamed hydrophilic polymer solution onto a support substrate to form a coated support substrate; and
   (c) treating said foamed hydrophulic polymer solution by exposing said foamed hydrophilic polymer solution to a source of microwave radiation for 8 minutes or less to form an open-cell structure.

2. A method as claimed in claim 1, wherein the hydrophilic polymer comprises gelatin or a derivative thereof 3. A method as claimed in claim 1, in which the step of treating the foamed hydrophilic polymer solution lasts for 5 minutes or less.

4. A method as claimed in claim 3, in which the step of treating the foamed hydrophilic polymer solution lasts for 2 minutes or less.

5. A method as claimed in claim 1, wherein the step of generating the foamed hydrophilic polymer solution comprises high-shear stirring of a hydrophilic polymer solution such that air is entrained in said hydrophilic polymer forming bubbles therein.

6. A method as claimed in claim 1, wherein the step of generating the foamed hydrophilic polymer solution comprises adding a physical or chemical blowing agent to a solution of the hydrophilic polymer, and interacting with said blowing agent to cause it to decompose, thereby generating a blowing gas.

7. A method as claimed in claim 6, wherein the step of interacting with the blowing agent comprises heating the solution.

8. A method as claimed in claim 6, wherein the step of interacting with the blowing agent comprises adding an acid to said solution to react with the blowing agent, thereby generating gas.

9. A method as claimed in claim 1, wherein the step of treating the foamed hydrophilic polymer solution results in drying the coated support substrate.

10. The method of claim 1 wherein the foamed hydrophilic polymer solution contains an aqueous solvent.

11. The method of claim 10 wherein the support is a resin coated paper.

12. A method of making an inkjet receiver consisting essentially of a support substrate and a porous hydrophilic polymer ink-receiving layer thereon, said method comprising the steps of:
    (a) generating a foamed hydrophilic polymer solution;
    (b) coating the foamed hydrophilic polymer solution onto a coated resin support substrate to form a coated support substrate; and
    (c) treating said foamed hydrophulic polymer solution by exposing said foamed hydrophilic polymer solution to a source of microwave radiation for 8 minutes or less to form an open-cell structure of the porous hydrophilic polymer ink receiving layer.

13. A method of making an ink jet receiver containing a coated resin support substrate and a porous hydrophilic polymer ink-receiving layer thereon, said method comprising the steps of:
    (a) generating a composition consisting essentially of a foamed hydrophilic polymer solution;
    (b) coating the foamed hydrophilic polymer solution onto a support substrate to form a coated support substrate; and
    (c) treating said foamed hydrophilic polymer solution by exposing said foamed hydrophilic polymer solution to a source of microwave radiation for 8 minutes or less to form an open-cell structure.

14. A material obtained by the method of claim 1.

15. An inkjet receiver comprising a material according to claim 14.

16. The ink-jet receiver of claim 15, comprising a support and an ink-receiving layer on said support, said ink receiving layer comprising said material.

17. A method of inkjet printing comprising jetting an aqueous ink onto the material of claim 14.

* * * * *

UNITED STATES PATENT AND TRADEMARK OFFICE
CERTIFICATE OF CORRECTION

PATENT NO. : 7,582,335 B2  Page 1 of 1
APPLICATION NO. : 10/551916
DATED : September 1, 2009
INVENTOR(S) : Hunt et al.

It is certified that error appears in the above-identified patent and that said Letters Patent is hereby corrected as shown below:

Column 11, line 35, Claim 1, delete "hydrophulic" and insert -- hydrophilic --.

Column 11, line 40, Claim 2, delete "thereof" and insert -- thereof. --.

Column 12, line 27, Claim 11, delete "hydrophulic" and insert -- hydrophilic --.

Signed and Sealed this

Seventeenth Day of November, 2009

David J. Kappos
*Director of the United States Patent and Trademark Office*